United States Patent [19]
Togai et al.

[11] Patent Number: 5,417,191
[45] Date of Patent: May 23, 1995

[54] CONTROL DEVICE FOR AUTOMOBILE ENGINE INCLUDING A VALVE SYSTEM WHICH OPENS AND CLOSES INTAKE AND EXHAUST VALVES BY RECIPROCATIVE FORCE OF CRANKSHAFT

[75] Inventors: Kazuhide Togai, Takatsuki; Shinichi Murata, Kyoto, both of Japan

[73] Assignee: Mitsubishi Jidosha Kogyo Kabushiki Kaisha, Tokyo, Japan

[21] Appl. No.: 140,018

[22] PCT Filed: Feb. 25, 1993

[86] PCT No.: PCT/JP93/00232
§ 371 Date: Mar. 23, 1994
§ 102(e) Date: Mar. 23, 1994

[87] PCT Pub. No.: WO93/17230
PCT Pub. Date: Sep. 2, 1993

[30] Foreign Application Priority Data

Feb. 28, 1992 [JP] Japan .................. 4-044003

[51] Int. Cl.⁶ .................. F02D 13/02; F02D 41/22; F02D 43/00
[52] U.S. Cl. .................. 123/333; 123/90.15
[58] Field of Search .............. 123/332, 333, 90.15, 123/90.16, 90.17

[56] References Cited

U.S. PATENT DOCUMENTS

| | | | |
|---|---|---|---|
| 4,638,781 | 1/1987 | Shiki et al. | 123/333 |
| 4,771,746 | 9/1988 | Kobayashi | 123/333 |
| 4,938,187 | 7/1990 | Seki | 123/333 |
| 4,938,188 | 7/1990 | Seki et al. | 123/333 |
| 4,941,442 | 7/1990 | Nanyoshi et al. | 123/333 |
| 4,998,519 | 3/1991 | Kobayashi | 123/333 |
| 5,099,806 | 3/1992 | Murata et al. | 123/90.16 |

FOREIGN PATENT DOCUMENTS

| | | |
|---|---|---|
| 2161154 | 6/1990 | Japan . |
| 3213604 | 9/1991 | Japan . |

*Primary Examiner*—Henry C. Yuen
*Assistant Examiner*—Weilun Lo

[57] ABSTRACT

A control device includes a valve system which can selectively operate at least one of an intake and exhaust valves of an automobile engine by means low speed cams 12 or high speed cams 13. It further includes an engine speed detecting device; and operation mode determining device for determining whether the engine is in a low or high speed operation mode based on engine speed data, and for producing a signal indicative of a current operation mode. The control device varies a fuel supply suspending engine speed for each operation mode based on the signal from the operation mode determining device, and issues a fuel-supply suspending command when the current engine speed is above the fuel supply suspending engine speed. An optimum fuel supply suspending engine speed is set for each engine operation mode, so that the valve system can operate reliably even when operation mass applied thereto varies.

24 Claims, 12 Drawing Sheets

FIG. 3
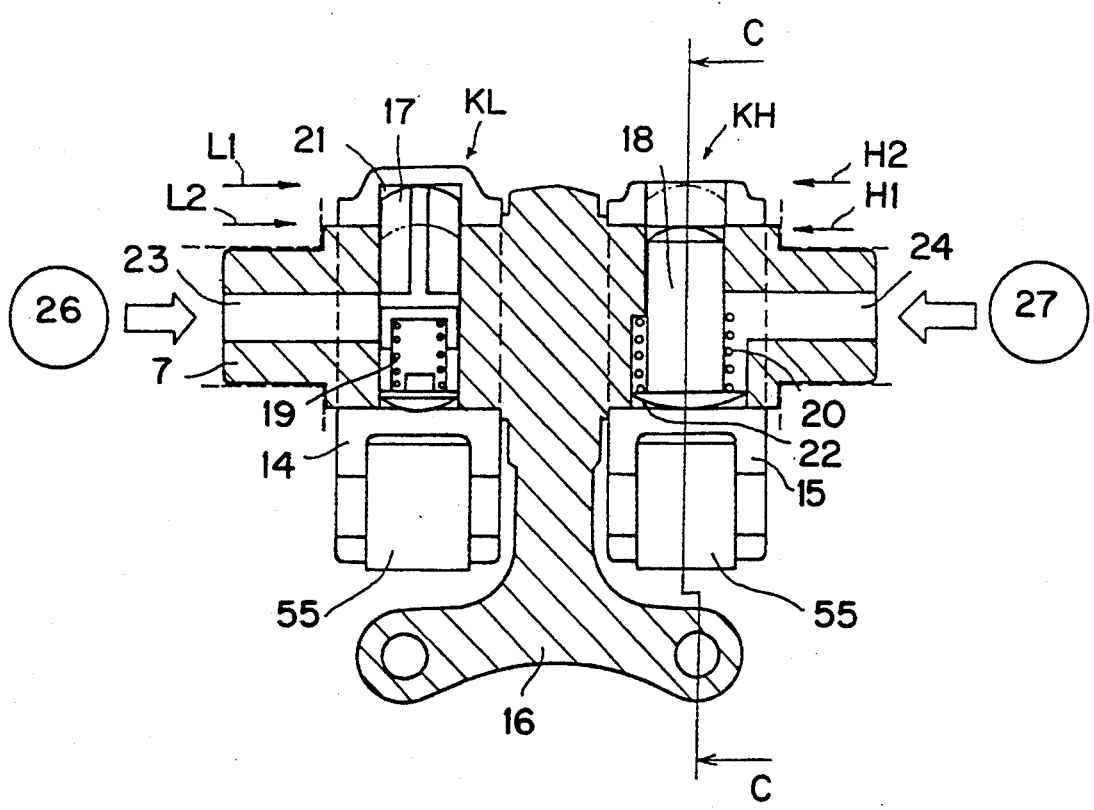
FIG. 4(a)    FIG. 4(b)    FIG. 4(c)
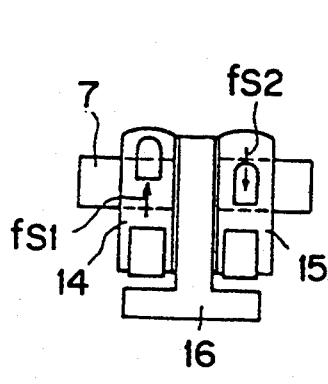 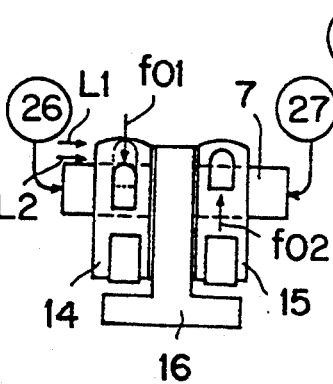 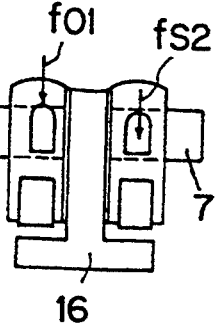

CONTROL DEVICE FOR AUTOMOBILE ENGINE INCLUDING A VALVE SYSTEM WHICH OPENS AND CLOSES INTAKE AND EXHAUST VALVES BY RECIPROCATIVE FORCE OF CRANKSHAFT

FIELD OF THE INVENTION

The present invention relates to a device and a method for controlling an automobile engine, in which a valve system includes a valve operating mechanism for selectively operating low or high speed cams and activating and deactivating intake or exhaust valves by selected low or high speed cams.

BACKGROUND OF THE INVENTION

There are known a number of automobile engines which include: a valve operating mechanism for selectively operating low or high speed cams and activating valves by the selected cams at proper timings so as to increase an engine output; a valve operating mechanism for selectively operating low or high speed cams, activating valves by the selected cams, and allowing a partial cylinder operation by disconnecting a part of engine cylinders; or a valve operating mechanism for suspending or suppressing the operation of a part of intake and exhaust valves depending upon operating conditions of the engine so as to increase an engine output.

A control device sets various operating modes for controlling such a valve operating mechanism. For instance, when the partial cylinder operation mode is selected, the control device controls the valve operating mechanism having the cylinder disconnecting function in a manner such that the valve operating mechanism suspends the operation of intake and exhaust valves of cylinders to be disconnected and the fuel supply to the disconnected cylinders. After the partial cylinder operation mode is canceled, the control device allows the valve operating mechanism to activate all the cylinders and permits the fuel supply to them. During the full cylinder operation mode at a low engine speed, the control device controls the valve operating mechanism in a manner such that low speed cams operate the intake and exhaust valves so as to increase volume efficiency. Conversely, during the full cylinder operation mode at a high engine speed, high speed cams operate the intake and exhaust valves so as to increase the volume efficiency.

Usually, a speed at which fuel supply is suspended (called "fuel supply suspending speed" hereinafter) is set in internal combustion engines so as to prevent an overspeed of the engine. For instance, Japanese Patent Laid-open Publication No. Hei 2-161,154 describes a system in which a fuel supply suspending speed is set relatively low when the valves are operated by cams which push the valves at a high speed, while such a speed is relatively high when the valves are operated by cams which push the valves at a low speed.

In conventional control devices, the fuel supply suspending speeds are determined based only on the speed at which the valves are pushed by the cams. Therefore, if operation mass increases in a valve system which is operated by cams having the same profile, a valve spring fails to follow, which causes unfavorable valve bounce. This phenomenon would result in trouble such as valve breakage and excessive friction. To overcome this trouble, it is advantageous to strengthen the valve spring and to reduce the operation mass of the valve system. Such measures, however, would lead to new problems such as an increased friction at contact areas between the cams and rocker arms, or insufficient strength of the valve operating mechanism.

It is therefore an object of the invention to provide a device and a method for protecting the internal combustion engine against damages in the valve system when changing a speed to operate the valves.

SUMMARY OF THE INVENTION

According to a first aspect of the invention, there is provided a control device comprising: a valve system for selectively operating at least one of an intaker and exhaust valve by means of at least one of low and high speed cams coupled to a cam shaft; engine operation status detecting means; operation mode data determining means for detecting operation status, including engine speed for determining whether the intake and exhaust valves are operated in a low speed mode by the low speed cam or, in a high speed mode by the high speed cam or in a mode which is present in a given period of time immediately after a mode change-over command is issued, and outputting operation mode data indicative of the determination; means for outputting a signal indicative of a fuel supply suspending engine speed for each operation mode of the engine based on the operation mode data output by the operation mode determining means; and fuel injection suspending means for providing a fuel supply suspending command to a fuel supply system when the engine speed detected by the engine operation status detecting means exceeds the fuel supply suspending engine speed.

In this arrangement, the control device allows: selectively operating at least one of intake and exhaust valves by means of at least one of low and high speed cams; detecting an operation status of the engine including engine speed; determining whether the intake and exhaust valves are operated in a low speed mode by the low speed cams, in a high speed mode by the high speed cams or in a mode which is present in a given period of time immediately after a mode change-over command is issued, and providing operation mode data indicative of the determination; outputting a signal indicative of fuel supply suspending engine speed for each provided operation mode based on the operation mode data; and issuing a fuel supply suspending command to the fuel supply system when a detected engine speed exceeds the fuel supply suspending engine speed. In the operation mode changing period, since the operation mass of the valve system is increased, the engine is prone to overspeed. The fuel suspending speed is set to be low in this period.

Thus, the control device can protect the engine against overspeed of and damage in the valve system during the operation mode changing period.

The valve system is disposed near the cam shaft, and comprises a rocker shaft rotatably supported on an engine support, a lever which is integral with the rocker shaft which includes an arm portion for receiving the intake and exhaust valves therein, a low speed rocker arm which is rotatably attached on the rocker shaft and which is rocked by the low speed cam, and a high speed rocker arm which is rotatably attached on the rocker shaft and which is rocked by the high speed cam.

The low and high speed rocker arms are respectively activated by the low speed cam and the high speed cam, and include roller bearing devices which are rotatable therein so as to improve durability of the rotating parts of the valve system.

The fuel supply suspending speed depends upon mass of the lever, low and high speed rocker arms, and force of the valve spring or arm spring, and speeds at which the low and high speed cams push the valves, thereby preventing the overspeed of the valve system.

A signal indicative of a fuel supply resuming speed is produced to disable the fuel supply suspending command when the engine speed is decreased to an optimum value.

The fuel supply resuming speed is smaller than the fuel supply suspending speed so as to prevent hunting at the time of decrease or increase of the engine speed.

In a second aspect of the invention, there is provided a method of controlling an automobile engine, comprising the steps of: detecting an operation status of the engine including engine speed; determining, based on the detected operation status, whether the engine is in a low, a high speed operation mode or in a mode which is present in a given period of time immediately after a mode change-over command is issued and providing operation mode date indicative of the determination; outputting a signal indicative of a fuel supply suspending speed based on the provided operation mode data; and issuing a fuel supply suspending command to a fuel supply system when a detected engine speed exceeds the fuel supply suspending speed. Thus, the control device can protect the valve system of the engine against overspeed and damages caused by the overspeed during the operation mode changing period. These and other objects of the present application will become more readily apparent from the detailed description given hereinafter. However, it should be understood that the preferred embodiments of the invention are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 3 is a cross-sectional view of the valve system taken along line A—A in FIG. 2.

FIG. 4(a) shows the operation of the valve system in a low speed operation mode of the engine.

FIG. 4(b) shows the operation of the valve system in a high speed operation mode of the engine.

FIG. 4(c) shows the operation of the valve system during the partial cylinder operation mode of the engine.

DETAILED DESCRIPTION OF PREFERRED EMBODIMENTS

Figure 1:
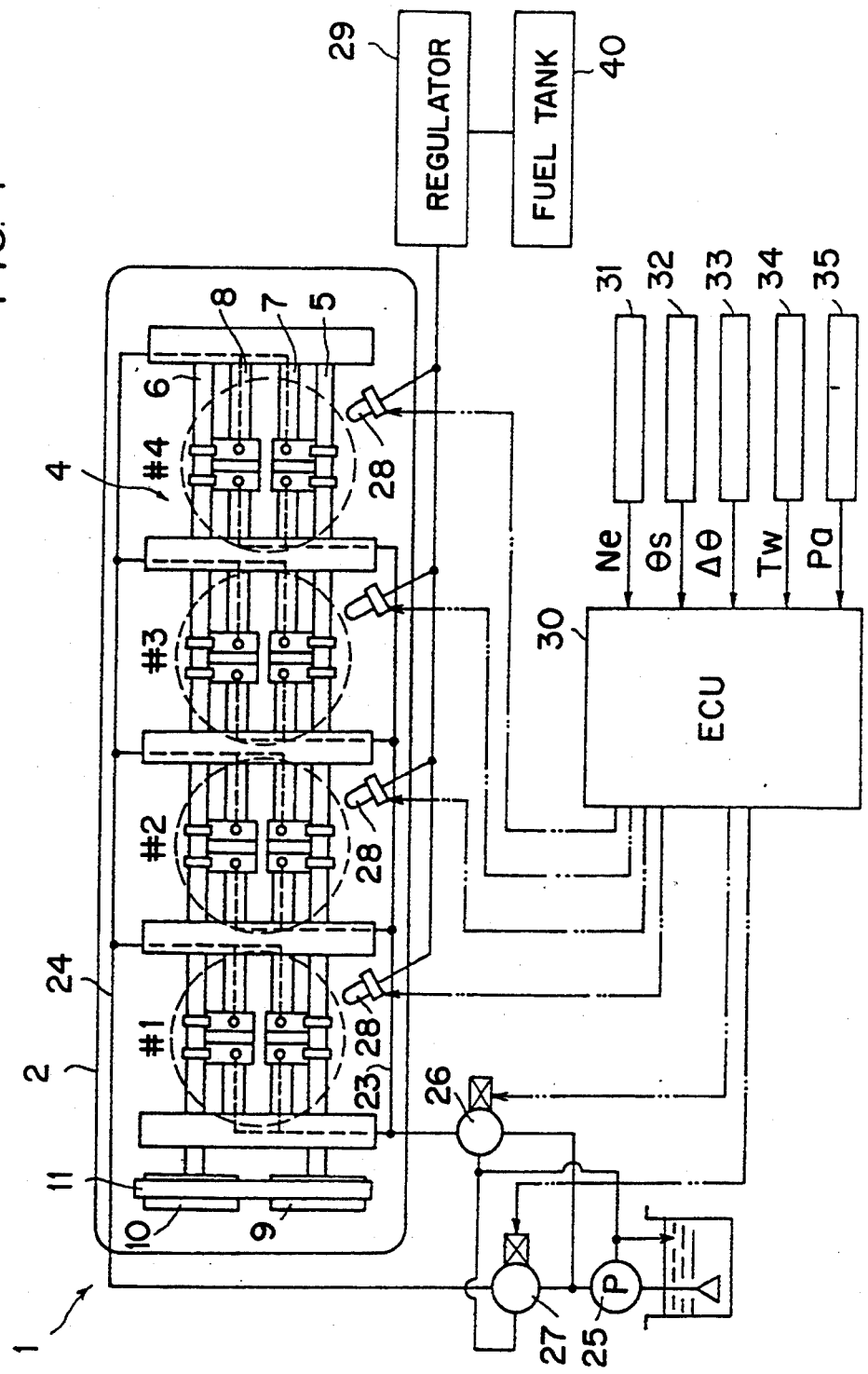
FIG. 1 is a schematic view showing the configuration of a control device for an internal combustion engine including a valve operating mechanism, according to a first embodiment of the invention.

Referring to FIG. 1, a control device of the invention is applicable to an in-line four-cylinder engine 1 of the DOHC type (called "engine 1") having a valve operating mechanism for selectively operating low or high speed cams, and activating and deactivating the valves via the selected low or high speed cams.

Figure 2:
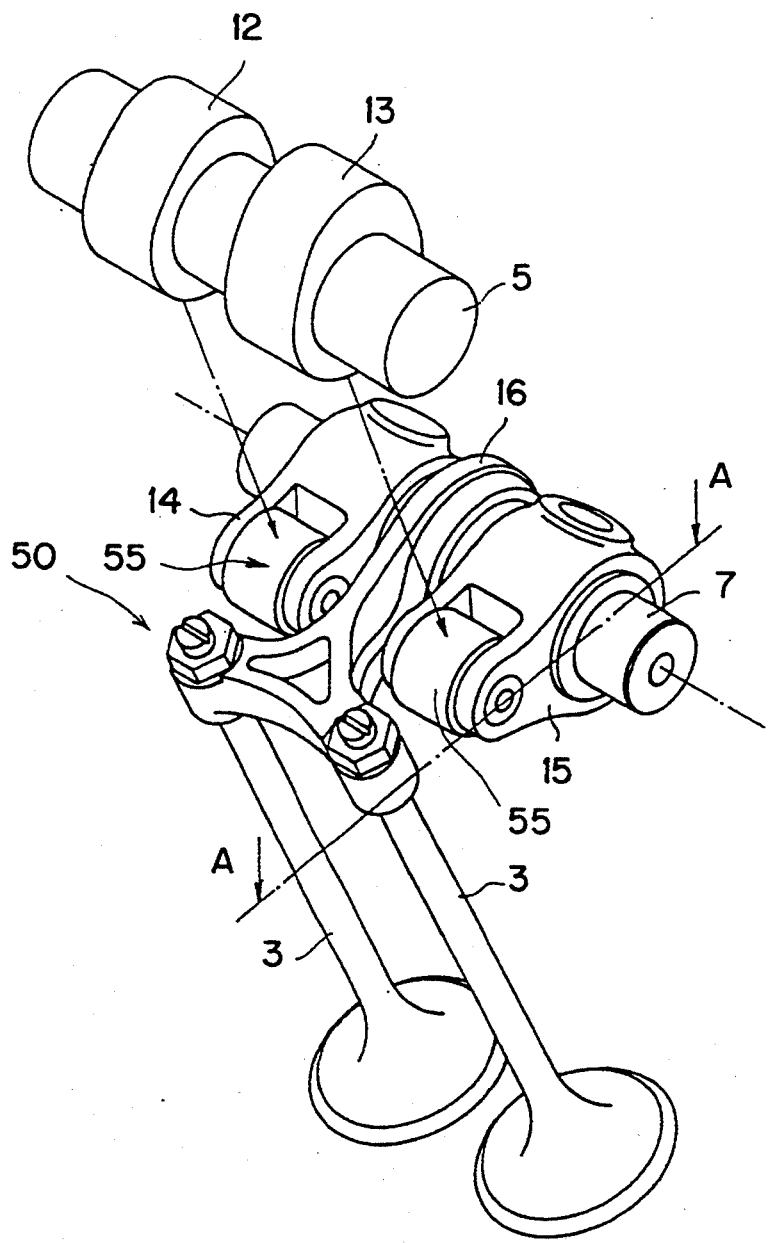
FIG. 2 is an exploded perspective view of a valve system to which the control device of FIG. 1 is applied.

The engine 1 includes intake and exhaust systems (not shown) on a cylinder head 2 thereof. These intake and exhaust systems communicate with respective cylinders. The intake system is opened and closed by intake valves 3 (one example of which is shown in FIG. 2) while the exhaust system is opened and closed by exhaust valves (not shown). The intake and exhaust valves are activated by the valve system 4. The valve system 4 includes intake and exhaust camshafts 5 and 6, and rocker shafts 7 and 8, all of which are coupled to the cylinder head 2. The cam shafts 5 and 6 have timing gears 9 and 10 integrally attached at their ends, respectively. These timing gears 9 and 10 are coupled to a crankshaft (not shown) via a timing belt 11 so that both of these cam shafts turn at a speed which is one half the engine speed. The rocker shafts 7 and 8 are separately provided for the respective cylinders.

All the intake and exhaust valves of the cylinders are opened and closed by the valve system 4 in the similar manner. As shown in FIG. 2, the rocker shaft 7 includes, as an integral part, a T-shaped lever 50 (having mass $M_{TL}$), which has an arm 16 and is positioned between a low speed rocker arm 14 (having mass $M_{LR}$) driven by a low speed cam 12 and a high speed rocker arm 15 (having mass $M_{HR}$) driven by a high speed cam 14. Specifically, the T-shaped lever 50 is integral with the rocker shaft 7 at its one end, is forked at the other end thereof, and has a pair of intake valves 3 at the forked ends. The low speed rocker arm 14 has, at its one end, a roller 55 which is rotatable therein. The high speed rocker arm 15 has a roller 55 similarly to the low speed rocker arm 14. The low and high speed cams 12 and 13 are disposed in a manner such that they come into contact with the rollers 55 of the low and high speed rocker arms 14 and 15, respectively. As shown in FIG. 3, the low and high speed rocker arms 14 and 15 are coupled, at their other ends, to a low speed cam selecting device KL and a high speed cam selecting device KH, respectively. These low and high speed cam selecting device KL and KH constitute a main part of the valve operating mechanism. The low speed cam selecting device KL comprises a pin 17 which is slidable in the rocker shaft 7, an oil pressure chamber 21 for moving the pin 17 with a pressure fo1 against a force fs1 of a spring 19, an oil path 23 communicating with the oil pressure chamber 21, and a low speed solenoid valve 26 for intermittently connecting the oil path 23 to an oil pump 25. The high speed cam selecting device KH comprises a pin 18 which is slidable in the rocker shaft 7, an oil pressure chamber 22 for moving the pin 18 with a pressure fo2 against a force fs2 of a spring 20, an oil path 24 communicating with the oil pressure chamber 22, and a high speed solenoid valve 27 for intermittently connecting the oil path 24 to the oil pump 25. The hydraulic pump 25 communicates with a fuel tank shown in FIG. 1. The solenoid valves 26 and 27 are three-side valves. When actuated, the solenoid valve 26 (or 27) supplies the pressured oil to the oil pressure chamber 21 (or 22). Conversely, when it remains inactive, the solenoid valve 26 (or 27) connects the oil pressure chamber 21 (or 22) to a drain. The solenoid valves 26 and 27 are controlled by an engine control unit (ECU) 30 to be described later.

Figure 5:
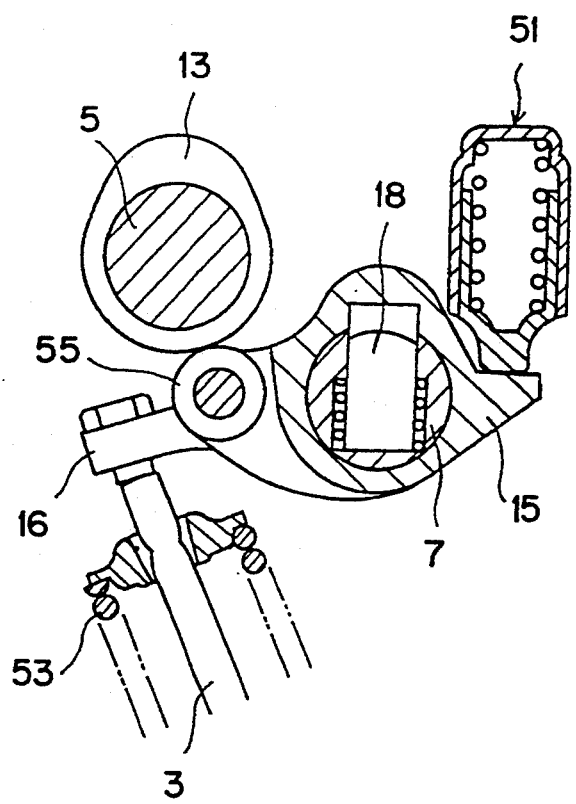
FIG. 5 is a cross-sectional view of the valve system taken along line C—C of FIG. 3.
Figure 6:
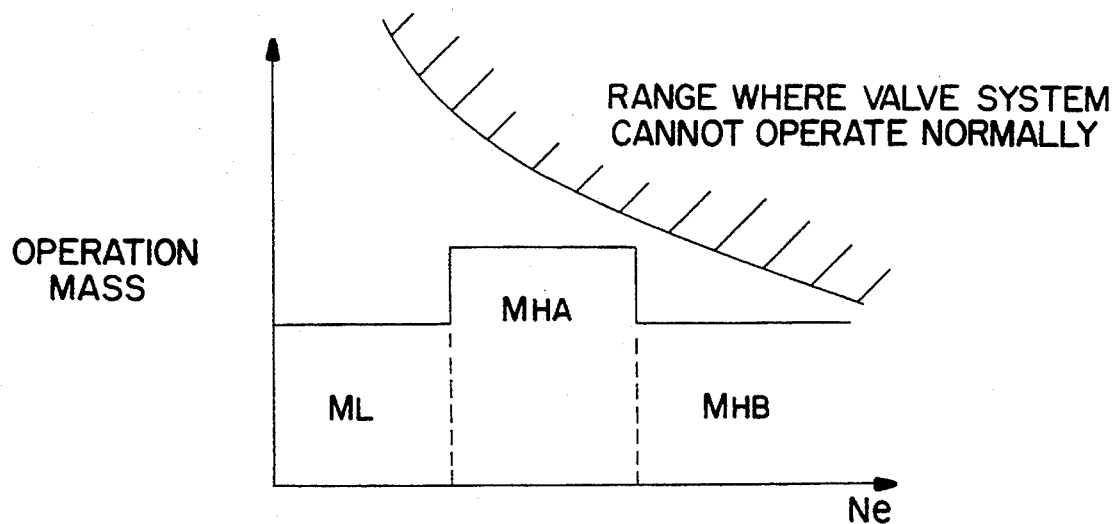
FIG. 6 is a graph showing the relationship between an engine speed and operation mass applied to a valve spring of the valve system.

As can be seen in FIGS. 3, 4 and 5, when the solenoid valves 26 and 27 are inactive, the forces fs1 and fs2 of the springs 19 and 20 act on the pin 17 at the locked position L1 in the low and high speed cam selecting device KL and KH, so that only the low speed rocker arm 14 becomes integral with the rocker shaft 7 and operates the intake valves 3 at a low speed via the arm 16 of the T-shaped lever 50 (FIG. 4(a)). Under this condition, the pin 18 is held at the non-locked position H1, thereby allowing the intake valves 3 to operate in the low speed mode. Thus, small operation mass $M_L$ is applied to the valve-spring 53 as shown in FIG. 6.

Conversely, when both of the solenoid valves 26 and 27 are active, the pressures fo1 and fo2 act on the pin 17 against the forces of the springs, so that the pin 17 is moved to the non-locked position. L2, and the pin 18 is moved to the locked position H2. Under this condition, only the high speed rocker arm 15 becomes integral with the rocker shaft 7 and operates the intake valves 3 in the high speed mode via the arm 16 of the T-shaped lever 50 (FIG. 4(b)). The low speed mode is changed to the high speed mode via the mass increasing mode. In the mass increasing mode, the pins 17 and 18 are at their locked positions L1 and H2, and the intake valves 3 operate in accordance with the profile of the high speed cam 13. Specifically, the low and high speed rocker arms 14 and 15 and the T-shaped lever 50 operate in an integral manner. Thus, the operation mass $M_{HA}$ applied to the valve spring 53 is largest as shown in FIG. 6.

When only the solenoid valve 26 is active, the force fs2 of the spring 20 acts on the pressure fo1 of the oil pressure chamber 21, and moves the pin 17 back to the non-locked position L2, so that the T-shaped lever 50 is kept inactive. Under this condition, the operation mass $M_{HB}$ applied to the valve spring 53 is small as shown in FIG. 6.

Referring to FIG. 1, fuel injectors 28 are disposed on the cylinder head 2 so as to supply fuel to intake ports (not shown) of the respective cylinders. The fuel injectors 28 are supplied with the fuel from the fuel tank 40. The fuel is adjusted to a preset pressure by a regulator 29. Fuel injection timings of the fuel injectors 28 are controlled by the engine control unit ECU 30.

The engine control unit ECU 30 mainly comprises a microcomputer, and controls the operation of the engine. Specifically, the ECU 30 functions as the following device: operation mode data detecting device which determines, based on operation mode data from operation mode detecting device, whether the engine is operating in the low or high speed mode, and outputs data on the current operation mode; a device for providing a low or high speed cam selecting signal to the low or high speed cam selecting device when the current operation mode differs from the previous operation mode; device for varying fuel a supply suspending speed according to the current operation mode; and a fuel injection interrupting device which provides a command for interrupting the fuel injection when the current engine speed exceeds the fuel supply suspending speed.

As shown in FIG. 1, the ECU 30 receives various operation data such as an engine speed Ne from an engine speed sensor 31, a throttle opening $\theta_s$ from a load sensor 32, a unit crank angle signal $\Delta\theta$ from a crank angle sensor 33, a cooling water temperature Twt from a temperature sensor 34, and atmospheric pressure Pa from an atmospheric pressure sensor 35.

The operation of the control device of the present invention will be described with reference to control programs shown in FIGS. 8 to 11.

The actuation of the main switch (not shown) allows the ECU 30 to perform its control operations according to the main routine.

Figure 7:
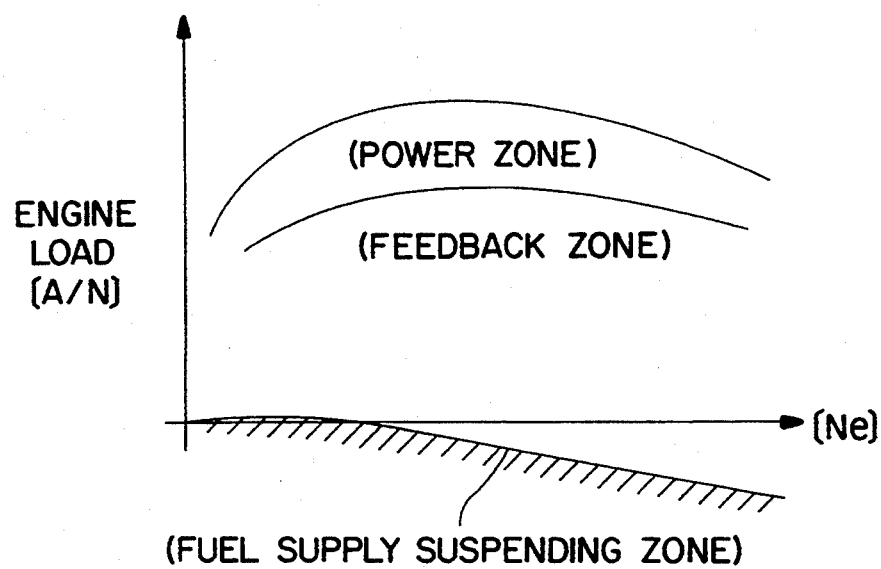
FIG. 7 is a map for an engine control unit ECU of the control device to calculate an engine operation range.
Figure 8:
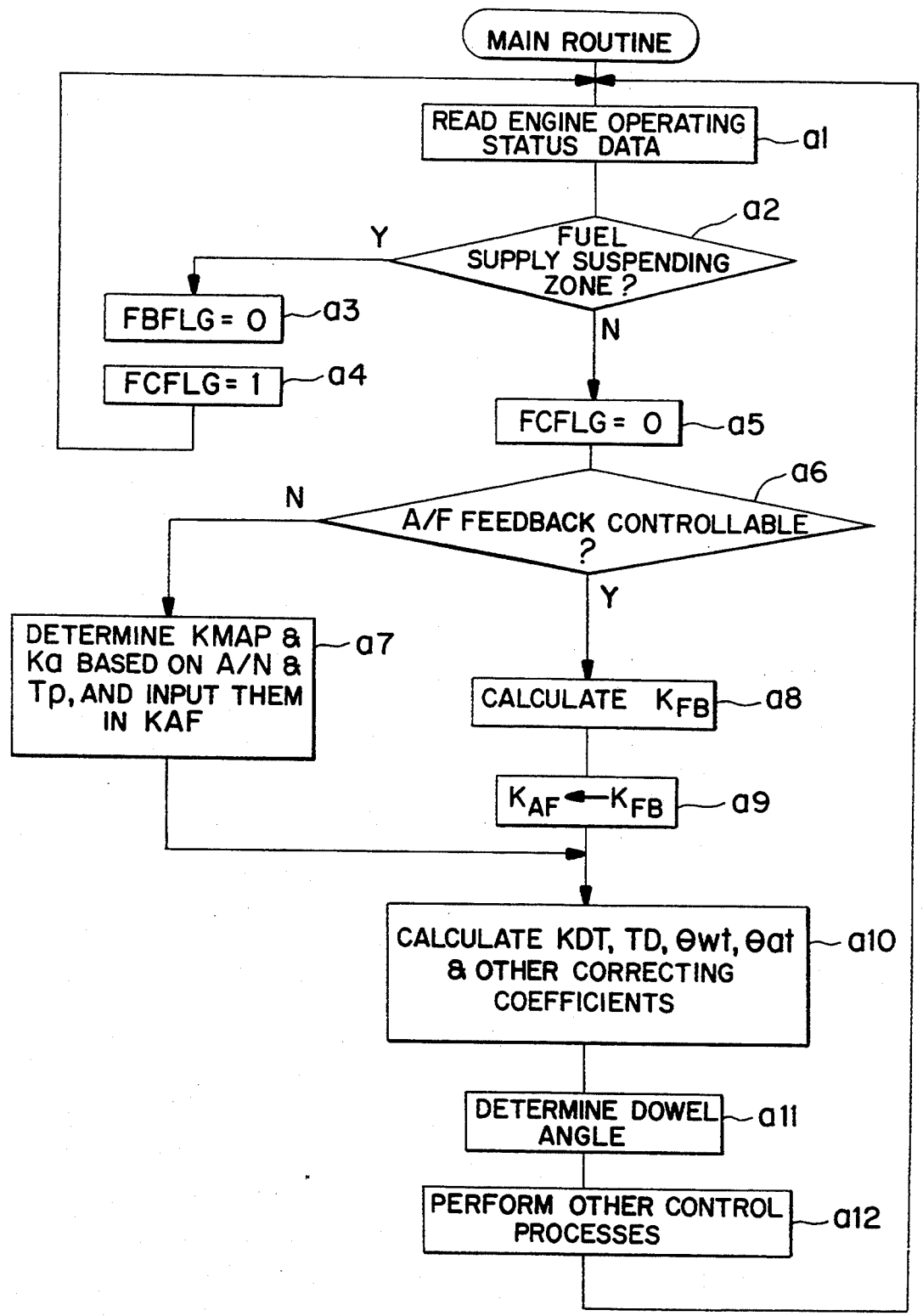
FIG. 8° is a flow chart of a main routine of control device for the internal combustion engine of FIG. 1.
Figure 9:
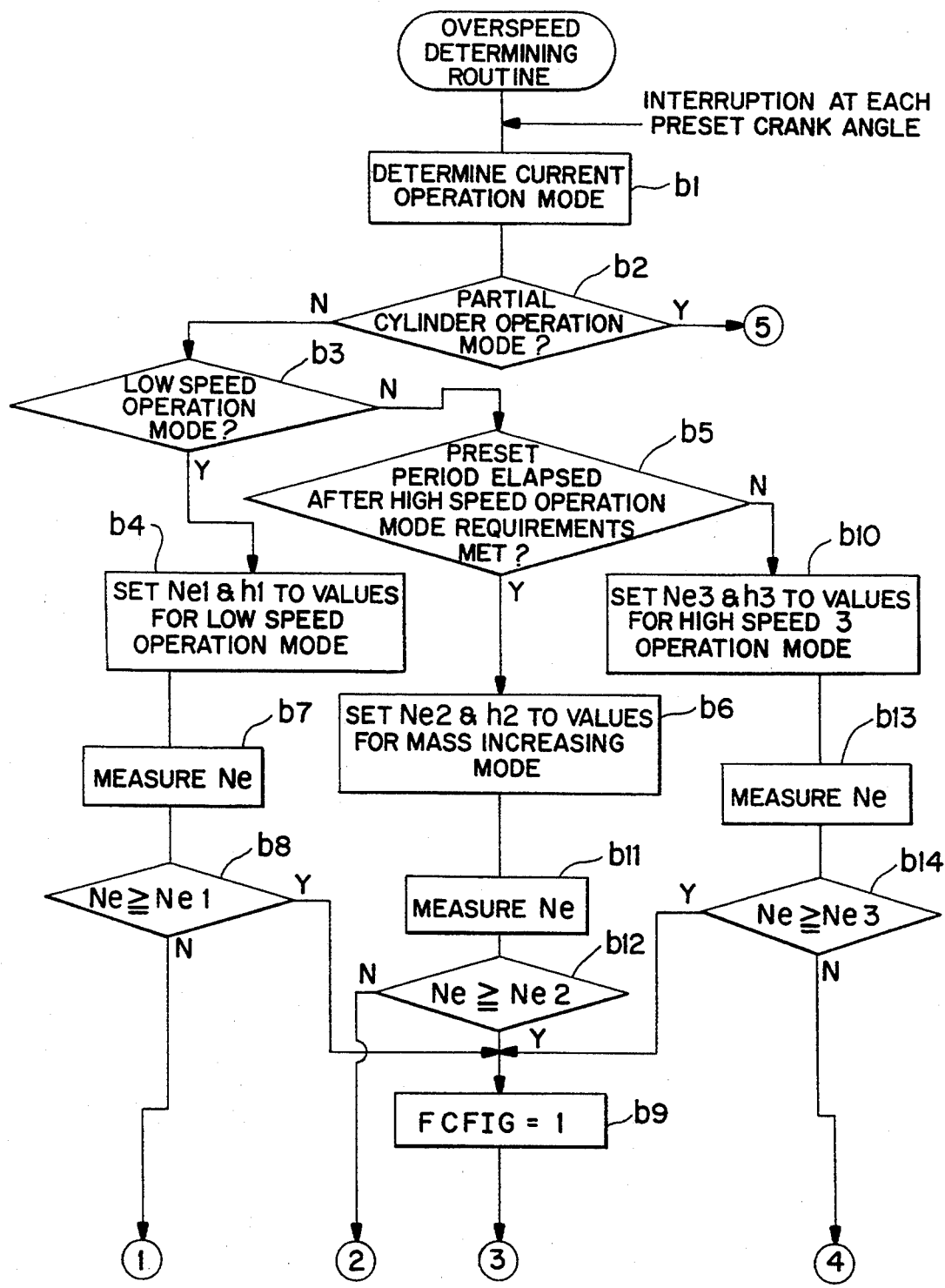
FIG. 9 is a flow chart for the control device to determine whether the engine is operating at an over-speed.
Figure 10:
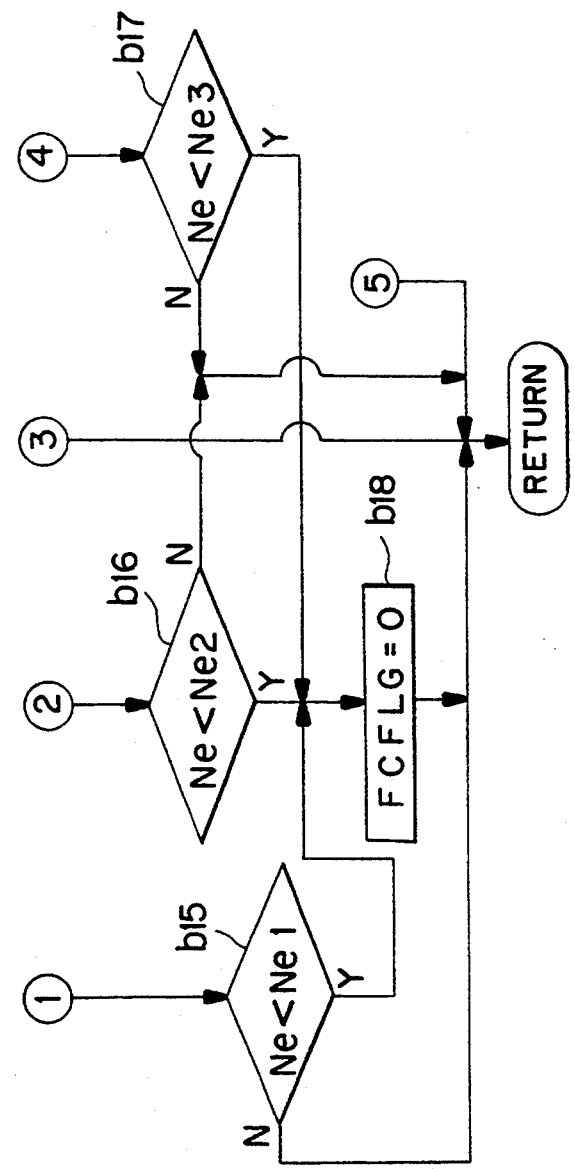
FIG. 10 is a continuation of the flow chart of FIG. 9.

First of all, the ECU 30 performs initialization, reads various, engine operation data, and goes to step a2. In step a2, the ECU 30 determines whether the engine is operating in a fuel supply suspending zone based on an operating range map (shown in FIG. 7 as an example) for calculating an operating zone with reference to the engine speed Ne and load data A/N. When the engine is operating in the fuel supply suspending zone, the ECU 30 advances to step A3, where it clears the air-fuel ratio feedback flag, sets the fuel supply suspending flag to 1, and returns to the initial state.

Conversely, when the engine is not in the fuel supply suspending zone in step a2, the ECU 30 goes to step a5, where it clears the fuel supply suspending flag. In step a6, the ECU 30 checks whether the requirements for air-fuel ratio feedback control are satisfied. When the engine is operating in a transient operation zone in which much fuel is injected for a longer period of time for acceleration, or in a state just before the completion of the engine start-up period, the ECU 30 calculates, in step a7, an air-fuel ratio correcting coefficient KMAP based on the current operation data (A/N and Ne), and a coefficient for correcting the length of the start-up period based on the cooling water temperature by using a map for this purpose, stores the calculated coefficients in an address KAF, and advances to step a10.

When the air-fuel ratio feedback control requirements are met in step a6, the ECU 30 calculates a target engine speed responsive to the current operation data (A/N and Ne). Then, the ECU 30 calculates a fuel amount correcting coefficient $K_{FB}$ to accomplish the target engine speed. In step a9, the ECU 30 stores the coefficient $K_{FB}$ in the address KAF, and goes to step a10.

In step a10, the ECU 30 sets a coefficient KDT for correcting fuel supply pulse width and TD for correcting dead time of fuel injection valves based on the engine operating data, and calculates correction coefficients to be used for calculating the ignition timing $\theta$adv. These correction coefficients are: a cooling water temperature correcting value $\theta$wt to advance the ignition timing in response to a decrease in the cooling water temperature; $-\theta acc$ for retarding the ignition timing at the time the accelerator pedal is depressed, and $-\theta acc$ is equivalent to $\Delta\theta s$ which is derived by differentiating throttle valve opening $\theta s$; an intake air temperature correcting value $\theta at$ for advancing the ignition timing in response to a decrease in the intake air temperature; $-\theta k$ for retarding the ignition timing in response to the increase of knocking signals Kn; and a battery correcting value tb for lengthening a power supplying period in response to a decreased battery voltage VB. After calculating these correction coefficients, the ECU 30 goes to step a11.

In step a11, a dowel angle is set based on a dowel angle calculating map (not shown) so that it increases in response to the engine speed Ne. Then, the ECU 30 performs its control operation as usual, and returns to the initial state.

An interruption takes place in the main routine at each preset crank angle. Then, the ECU 30 starts the overspeed determining routine. In this routine, the ECU 30 may function as an operation mode determining device which determines that the operation mode changing requirements (e.g. the load data A/N and the engine speed Ne have the preset relationship, the engine speed Ne is equal to or above the preset value, or the cooling water temperature Tw is equal to or above the preset value) are satisfied on the basis of the current operation data (A/N and Ne). Alternatively, the ECU 30 may function as an operation mode sensor which determines whether the current mode is the low or high speed operation mode, or the partial cylinder operation mode based on the data on the active or inactive state of the first and second solenoid valves 26 and 27. In the latter case, the ECU 30 becomes expensive because a sensor is necessary, and is disadvantageous because it takes time to determine the operation mode. When the partial cylinder operation mode is on the way, the ECU 30 returns. Otherwise, the ECU 30 advances to step b3. In step b3, when the low speed mode is being carried out, the ECU 30 sets a low fuel supply suspending speed Ne1 and a small hysteresis h1. This is because the high speed rocker arm is supported only by an arm spring 51 whose force is weaker than that of the valve spring. The high speed rocker arm under such a condition causes valve bounce when the engine is operating at a high speed. In step b7, the ECU 30 measures the current engine speed Ne, and checks, in step b8, whether the engine speed Ne is above Ne1+h1. When the current engine speed Ne is above Ne1+h1, the ECU 30 advances to step b9, where it sets FCFLG as a fuel injection interrupting command. When Ne is below Ne1+h1, the ECU 30 goes to step b15. When Ne is still above Ne1+h1, the ECU 30 returns. Otherwise, the ECU 30 clears FCFLG, and returns.

When it is not found in step b5 that the preset period of time has passed after the establishment of the operation mode changing requirements, the ECU 30 goes to step b6, where it sets the fuel supply suspending engine speed Ne1 and the hysteresis h1 to relatively small values corresponding to the mass increasing mode. This is because the engine is in the mass increasing mode in which the valves are operated by the high speed cam (with the pins 17 and 18 at their locked positions L1 and H2, respectively). In this mode, i.e. the transient operation mode from the low speed operation mode to the high speed operation mode, the operation mass $M_{HA}$ applied to the valve spring 53 is the largest as shown in FIG. 6. The fuel supply suspending speed Ne and hysteresis h1 are set at relatively small values. In step b11, the ECU 30 measures the current engine speed Ne, and checks, in step b12, whether the engine speed Ne is above Ne2+h2. When Ne>Ne2+h2, the ECU 30 goes to step b9, where the ECU 30 sets FCFLG to issue a fuel supply suspending command. Otherwise, the ECU 30 advances to step b16. When Ne>Ne2, the ECU 30 returns. Conversely, when Ne<Ne2, the ECU 30 clears FCFLG and returns.

On the other hand, when it is found in step b5 that the present period of time has passed after the operation mode changing requirements are satisfied, the ECU 30 goes to step b10, where it sets the fuel supply suspending engine speed Ne1 and the hysteresis h3 to relatively large values. This is because the operation mass applied to the valve spring 53 is relatively small in the high speed operation mode (with the pin 17 at the non-locked position L1, and the pin 18 at the locked position H2). In step b13, the ECU 30 measures the current engine speed Ne, and checks, in step b14, whether Ne is above Ne3+h3. When Ne>Ne3+h3, the ECU 30 goes to step b9, where it sets FCFLG to issue the command for suspending fuel supply. When Ne<Ne3+h3, the ECU 30 advances to step b17. Conversely, when Ne>Ne3, the ECU 30 returns. When Ne<Ne3 in step b17, the ECU 30 clears FCFLG in step b18 and returns.

As described so far, the low speed operation mode is switched over to the high speed operation mode via the mass increasing mode and vice versa. The fuel supply suspension is controlled by setting the fuel supply suspending engine speed Ne1, Ne2 or Ne3 and the hysteresis h1, h2 or h3 as threshold values according to the operation mass in each operation mode, so that the engine can be effectively protected against its overspeed. Especially, the fuel supply suspending engine speed is set in a wide range by adding the hysteresis h1, h2 or h3 to the fuel supply suspending engine speed Ne1, Ne2 or Ne3 when the engine speed is increased or decreased, so that the engine can be prevented from hunting.

The fuel supply suspending engine speed Ne1 for the low speed mode, Ne2 for the mass increasing mode or Ne3 for the high speed mode is derived by a formula (1):

$$Nen < 0.9 \times (60/\pi) \times P/((M \times \beta)/g) \qquad (1)$$

where M represents the operation mass and g acceleration due to gravity.

In the low speed operation mode, the fuel supply suspending speed Ne1 is calculated as follows. For example, a fuel supply suspending engine speed $Ne1_A$ to prevent bouncing of the arm spring 51 is calculated by the formula (1). In this case, P is a load which is applied to the valve spring when a lift of the valves activated by the low speed cam 12 is maximum. The operation mass $M_L$ is a total of $M_{TL}$ (operation mass of the T-shaped lever 50), $M_{LR}$ (operation mass of the low speed rocker arm 14), mass of the valves, and mass of the arm spring 51. $\beta$ represents a maximum negative acceleration at which the rocker arm tends to move away from the cam when the lift of the low speed cam 12 is substantially maximum. A fuel supply suspending engine speed $Ne1_B$ to prevent bounce of the arm spring 51 is also calculated by the formula (1) in the similarly manner. In the latter case, P is a load which is applied to the valve spring when a lift of the valves activated by the high speed cam 13 is maximum. The operation mass $M_1$ is a total of $M_{HR}$ (operation mass of the high speed rocker arm 15), and mass of the valves and the arm spring 51. $\beta$ represents a maximum negative acceleration at which the rocker arm 15 tends to move away from the cam when the lift of the high speed cam 13 is substantially maximum. Thereafter, $Ne1_A$ and $Ne1_B$ are compared, so that the smaller $Ne1_A$ or $Ne1_B$ is adopted as the fuel supply suspending engine speed Ne1 in the low speed operation mode.

The fuel supply suspending engine speed Ne2 in the transition operation mode is also derived by the formula (1), wherein P is a load applied to the valve spring when a lift of the valves activated by the high speed cam 13 is maximum, the operation mass $M_{Ha}$ is a total of $M_{TL}$ (operation mass of the T-shaped lever 50), $M_{LR}$ and $M_{HR}$ (operation mass of the low and high speed rocker arms 14 and 15), respectively, mass of the valves and the arm spring 51, and $\beta$ is a maximum negative acceleration at which the rocker arm moves away from the cam when the lift of the high speed cam 13 is substantially maximum.

Further, the fuel supply suspending engine speed Ne3 in the high speed operation mode is derived by the formula (1) in the similar manner, wherein P is a load applied to the valve spring when a lift of the valves activated by the high speed cam 13 is maximum, the operation mass $M_{HB}$ is a total of $M_{TL}$ (operation mass of the T-shaped lever 50), $M_{LR}$ and $M_{HR}$ (operation mass of the low and high speed rocker arms 14 and 15), mass of the valves and mass of the arm spring 51, and $\beta$ is a maximum negative acceleration at which the rocker arm moves away from the cam when the lift of the high speed cam 13 is substantially maximum. Thereafter, the fuel supply suspending engine speed $Ne3_B$ to prevent bouncing of the arm spring 51 in the high speed operation mode is derived by the formula (1) in the similar manner, wherein P is a load applied to the valve spring when a lift of the valves activated by the low speed cam 12 is maximum, the operation mass $M_{HB}$ is a total of $M_{TL}$ (operation mass of the T-shaped lever 50), $M_{LR}$ and $M_{HR}$ (operation mass of the low and high speed rocker arms 14 and 15), mass of the valves and the arm spring 51, and $\beta$ is a maximum negative acceleration at which the rocker arm moves away from the cam when the lift of the low speed cam 12 is substantially maximum. $Ne3_A$ and $Ne3_B$ are compared, and the smaller one of them is used as the fuel supply suspending engine speed Ne3 in the high speed operation mode.

Figure 11:
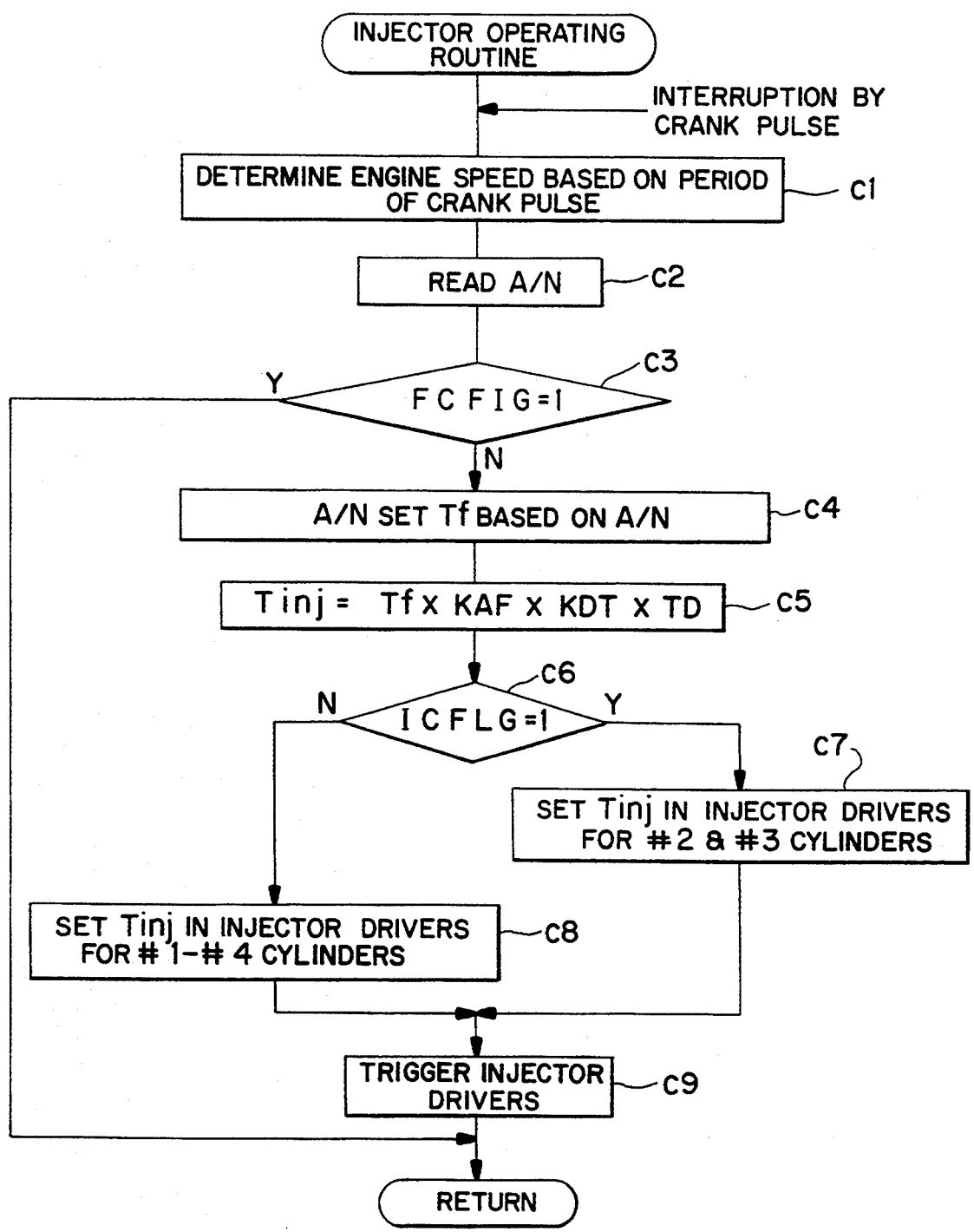
FIG. 11 is a flow chart of an injector operating routine for the control device of FIG. 1.

The injector operating routine shown in FIG. 11 is carried out by interruption which is taken at each crank angle which is different from that of the overspeed determining routine.

In this routine, the ECU 30 reads the engine speed Ne and the target amount A/N of intake air which has been calculated in another routine, and goes to step c3. In step c3, the ECU 30 receives the status data on FCFLG which are processed in step a2 of the main routine and step b9 of the overspeed determining routine, and checks whether the fuel supply suspension is allowable. When the fuel supply suspension is allowable, the ECU 30 returns. Otherwise, the ECU 30 goes to step c4, where it calculates the basic fuel supplying pulse width Tf based on the target intake air amount A/N. The ECU 30 then calculates the target fuel supplying pulse width Tinj based on the basic fuel supplying pulse width Tf, the air-fuel ratio correcting coefficient KAF, the atmospheric temperature and pressure correcting coefficient KDT, and the injector operation delay correcting coefficient TD.

In step c6, the ECU 30 checks whether ICFLG indicative of the valve inactivity is "1". When ICFLG is not "1", i.e. during the full cylinder operation mode, the ECU 30 goes to step c8. The ECU 30 sets the target fuel supplying pulse width Tinj in the drivers for the injectors 28 of the cylinders #1 to #4. Conversely, when ICFLG is "1", i.e. when the fuel supply suspending command is on, the ECU 30 advances to step b7, where it sets the target fuel supplying pulse width Tinj in the drivers for only the injectors 28 of the cylinders #2 and #3, thereby disconnecting the cylinders #1 and #4. In step c9, the ECU 30 triggers the drivers, and returns. Therefore, in the partial cylinder operation mode., the injectors 28 for the cylinders #2 to #3 inject fuel at the preset timing. On the other hand, in the full cylinder operation mode, the injectors 28 for the four cylinders #1 to #4 inject fuel at the preset timing. In the fuel supply suspending mode, fuel supply can be reliably suspended for all the cylinders, thereby preventing the over-speed of the engine.

In the foregoing embodiment, the engine has four cylinders and performs the partial cylinder operation by disconnecting two out of the four cylinders. Further, the number of cylinders to be disconnected in the partial cylinder operation mode may be variable. The present invention is also applicable to engines without the partial cylinder operation mode.

Figure 12:
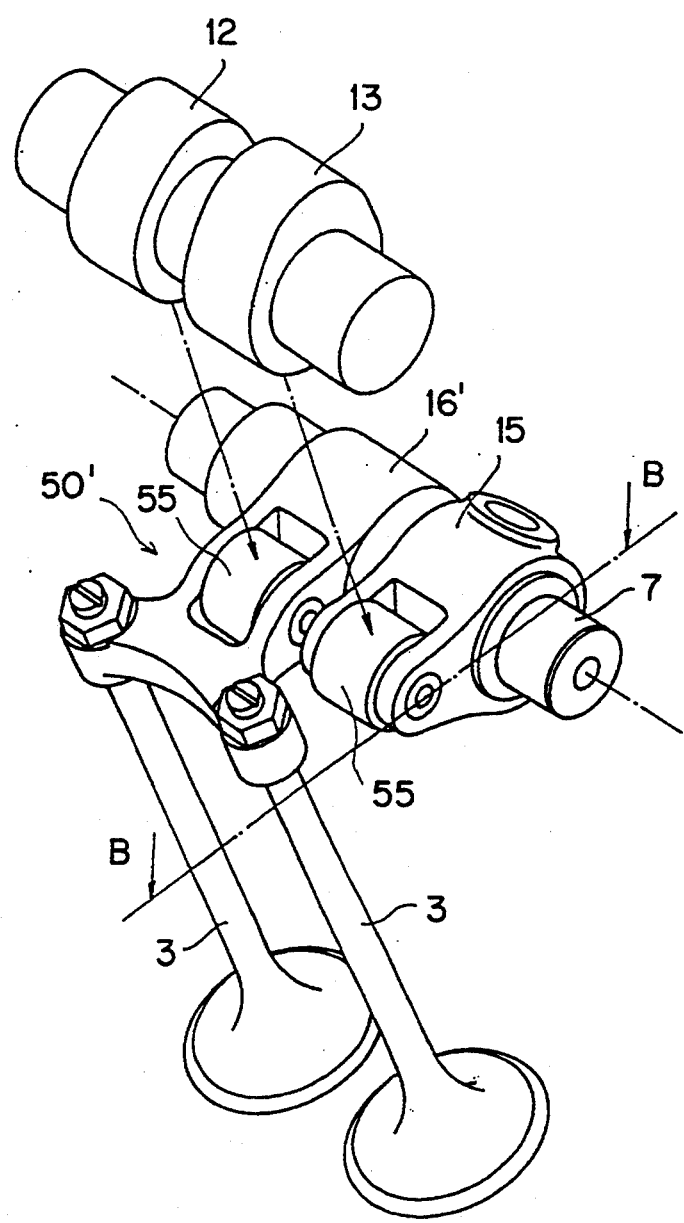
FIG. 12 is an exploded perspective view of a valve system to which a control device according to a second embodiment of the invention is applied.
Figure 13:
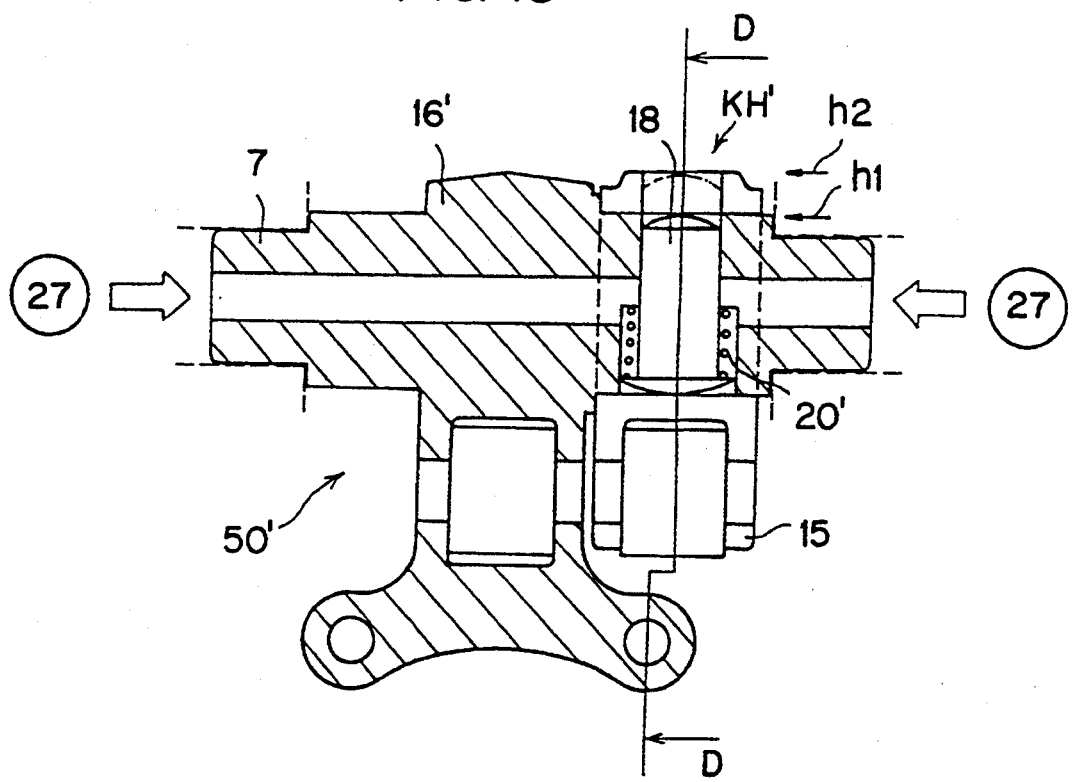
FIG. 13 is a cross-sectional view of the valve system taken along line B—B of FIG. 12.
Figure 14A:
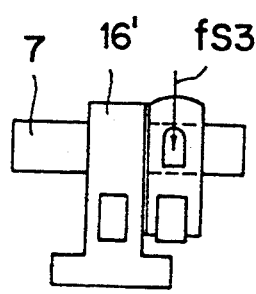
FIG. 14(a) shows the operation of the valve system of FIG. 12 in the low speed operation mode.
Figure 14B:
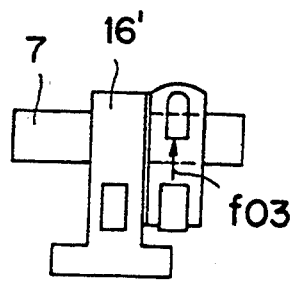
FIG. 14(b) shows the operation of the valve system in the high speed operation mode.
Figure 15:
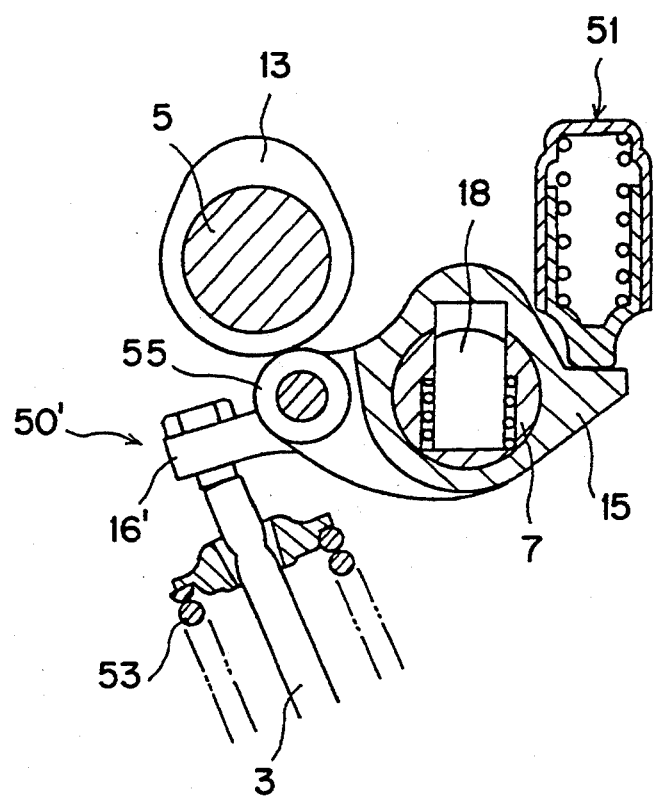
FIG. 15 is a cross-sectional view of the valve system taken along line D—D of FIG. 13.

The low speed cam selecting means KL comprises the low speed rocker arm 14 driven by the low speed cam 12, and the T-shaped lever 50 having the arm 16 integral with the rocker shaft 7. The high speed cam selecting means KH comprises the high speed rocker arm 15 driven by the high speed cam 13, and shares the T-shaped lever 50 with the selecting means KL. Alternatively, the low and high speed cam selecting means KL and KH may have a structure as shown in FIG. 12, and may comprise a T-shaped lever 50' having an arm 16' integral with the rocker shaft 7 to be operated by the low speed cam, and the high speed rocker arm 15 to be operated by the high speed cam 13. A pair of intake valves 3 are coupled to the forked ends of the T-shaped lever 50'. The T-shaped lever 50' has the roller 55 rotatably supported therein, with which the low speed cam 12 comes into contact. In this embodiment, only the high speed cam selecting means KH is attached to the high speed rocker arm 15, and is structured similarly to that shown in FIG. 1. As shown in FIGS. 13 to 15, the high speed cam selecting means KH operates the intake valves 3 via the T-shaped lever (L) 50' in the low speed operation mode (FIG. 13(a)) when the solenoid valve 27 is inactive, and force fs2 of the spring 20 acts to maintain the pin 18 at the non-locked position L1. Under this condition, the high speed rocker arm 15 follows the high speed cam 13 by using the arm spring 51, so that valve bounce might be caused by a large amplitude of the arm of the T-shaped lever during the high speed operation.

Conversely, when the solenoid valve 27 is active, the pin 20 is moved to the locked position h3 by the force fo3 against the springs, so that both the T-shaped lever (L) 50' and the high speed rocker arm 15 operate integrally. Under this condition, no large operation mass is applied to the valve spring. This simplified high speed cam selecting mechanism is also as effective as the cam selecting mechanism shown in FIG. 1, and can control the engine to prevent its over-speed by setting the fuel supply suspending engine speeds and hysteresis in the high and slow speed operation modes.

According to the invention, the ECU 30 determines whether the engine is in the low speed operation mode in which the low speed cam is used, or in the high speed operation mode using the high speed cam. When the current operation mode selected according to the engine operation data differs from the previous operation mode, and when the current engine speed is above the fuel supply suspending engine speed set for each operation mode, fuel supply can be suspended so as to protect the valve system against over-speed, specifically over-speed at the time of the operation mode change. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control device for an engine including a valve system which opens and closes intake and exhaust valves by reciprocative force of a crankshaft, the control device comprising:
    a valve system for selectively operating at least one of the intake and exhaust valves by means of at least one of low and high speed cams coupled to a camshaft;
    engine operation status detecting means for detecting an operating status, including engine speed;
    operation mode data determining means for determining whether the intake and exhaust valves are operated in a low speed mode by the low speed cam, in a high speed mode by the high speed cam, or in a mode which is present in a given period of time immediately after a mode change-over command is issued, and outputting operation mode data indicative of the determination;
    means for outputting a signal indicative of a fuel supply suspending engine speed for each operation mode of the engine based on the operation mode data output by the operation mode determining means; and
    fuel injection suspending means for providing a fuel supply suspending command to a fuel supply system when the engine speed detected by the engine operation status detecting means exceeds the fuel supply suspending engine speed.

2. A control device as in claim 1, wherein the engine operation status detecting means determines whether the engine speed is above or below a preset speed.

3. A control device as in claim 1, wherein the engine operation status detecting means determines whether a detected engine temperature is above or below a preset temperature.

4. A control device as in claim 1, wherein the valve system is disposed near the cam shaft, and includes a rocker shaft rotatably supported on an engine support, a lever which is integral with the rocker shaft and includes an arm portion for receiving the intake or exhaust valves therein, a low speed rocker arm which is rotatably attached on the rocker shaft and which is rocked by the low speed cam, and a high speed rocker arm which is rotatably attached on the rocker shaft and which is rocked by the high speed cam.

5. A control device as in claim 4, wherein the low and high speed rocker arms are respectively urged by a plurality of arm springs so as to come into contact with the low and high speed cams.

6. A control device as in claim 5, wherein the intake and exhaust valves are urged to close by valve springs.

7. A control device as in claim 4, wherein the low and high speed rocker arms are rotatably mounted on the rocker shaft at positions at both sides of the arm portion.

8. A control device as in claim 5, wherein the low and high speed rocker arms are activated by the low and high speed cams, respectively, and include roller bearings which are rotatable therein, respectively.

9. A control device as in claim 6, wherein the fuel supply suspending speed depends upon mass of the lever, mass of the low and high speed rocker arms, at least one of a force of the valve spring and the arm spring, and speeds at which the low and high speed cams push the intake and exhaust valves.

10. A control device as in claim 1, wherein the means for outputting the signal indicative of the fuel supply suspending engine speed also produces a signal indicative of a fuel supply resuming speeds usable to disable the fuel supplying suspending command from the fuel injection suspending means.

11. A control device as in claim 10, wherein the fuel supply resuming speed is lower than the fuel supply suspending speed.

12. A control device as in claim 10, wherein the difference between the fuel supply suspending speed and the fuel supply resuming speed is dependent upon each engine operation mode.

13. A method of controlling an engine including a valve system which opens and closes intake and exhaust valves by reciprocative force of a crankshaft, the method comprising the steps of:
    selectively operating at least one of the intake and exhaust valves of the engine by at least one of the low and high speed cams;
    detecting an operation status of the engine including engine speed;
    determining, based on the detected operation status, whether the engine is in a low speed operation mode in which cylinders are actuated by low speed cams, in a high speed operation mode in which the cylinders are actuated by high speed cams, or in a mode which is present in a given period of time immediately after a mode change-over command is issued, and providing operation mode data indicative of the determination;
    outputting a signal indicative of a fuel supply suspending speed based on the provided operation mode data; and
    issuing a fuel supply suspending command to a fuel supply system when the detected engine speed exceeds the fuel supply suspending speed.

14. A method as in claim 13, wherein the operation status of the engine is detected by determining whether the an engine speed is above a preset engine speed.

15. A method as in claim 13, wherein the operation status of the engine is detected by determining whether a detected engine temperature is above the preset temperature.

16. A method as in claim 13, wherein the engine comprises camshafts, rocker shafts which are rotatably mounted on an engine support at positions adjacent to the camshafts, levers integral with the rocker shaft, each lever including an arm portion in contact with intake and exhaust valves, low speed rocker arms rotatably mounted on the rocker shafts and activated by low speed cams, and high speed rocker arms rotatably mounted on the rocker shafts and actuated by high speed cams.

17. A method as in claim 13, wherein the low and high speed rocker arms are urged by a plurality of arm springs so as to come into contact with the low and high speed cams.

18. A method as in claim 17, wherein the intake and exhaust valves are urged to close by valve springs.

19. A method as in claim 16, wherein the low and high speed rocker arms are rotatably mounted on the rocker shafts at positions at both sides of the arm portions.

20. A method as in claim 16, wherein the low and high speed rocker arms are activated by the low and high speed cams, respectively, and include roller bearings which are rotatable therein, respectively.

21. A method as in claim 18, wherein the fuel supply suspending speed is dependent upon mass of the lever, mass of the low and high speed rocker arms, at least one of a force of the valve spring and the arm spring, and speeds at which the low and high speed cams push the intake and exhaust valves.

22. A method as in claim 13, wherein the step of outputting the signal indicative of the fuel supply suspending engine speed includes the substep of providing a signal indicative of a fuel supply resuming speed, usable to disable the issued fuel supplying suspending command.

23. A method as in claim 22, wherein the fuel supply resuming speed is lower than the fuel supply suspending speed.

24. A method as in claim 22, wherein a difference between the fuel supply suspending speed and the fuel supply resuming speed dependent upon each engine operation mode.

* * * * *